U S010727523B2

United States Patent
Kanno et al.

(10) Patent No.: US 10,727,523 B2
(45) Date of Patent: Jul. 28, 2020

(54) FUEL CELL STACK

(71) Applicants: TOYOTA JIDOSHA KABUSHIKI KAISHA, Toyota-shi, Aichi-ken (JP); TOYOTA SHATAI KABUSHIKI KAISHA, Kariya-shi, Aichi-ken (JP)

(72) Inventors: Daisuke Kanno, Nagoya (JP); Takenori Yamasaki, Nisshin (JP); Atsushi Ida, Nisshin (JP); Daisuke Hayashi, Nisshin (JP); Shuji Kurita, Toyota (JP); Takashi Kondo, Nagoya (JP); Keiji Hashimoto, Nagakute (JP)

(73) Assignees: Toyota Jidosha Kabushiki Kaisha, Toyota-shi, Aichi-ken (JP); Toyota Shatai Kabushiki Kaisha, Kariya-shi, Aichi-ken (JP)

( * ) Notice: Subject to any disclaimer, the term of this patent is extended or adjusted under 35 U.S.C. 154(b) by 140 days.

(21) Appl. No.: 15/933,828

(22) Filed: Mar. 23, 2018

(65) Prior Publication Data
US 2018/0277878 A1    Sep. 27, 2018

(30) Foreign Application Priority Data
Mar. 24, 2017  (JP) ................. 2017-058313

(51) Int. Cl.
*H01M 8/04119* (2016.01)
*H01M 4/90* (2006.01)
(Continued)

(52) U.S. Cl.
CPC ....... *H01M 8/2483* (2016.02); *H01M 4/9041* (2013.01); *H01M 8/0202* (2013.01);
(Continued)

(58) Field of Classification Search
CPC ............... H01M 8/2483; H01M 8/241; H01M 8/04156; H01M 8/0258; H01M 8/0202;
(Continued)

(56) References Cited

U.S. PATENT DOCUMENTS 6,410,179 B1 *  6/2002  Boyer ................. H01M 8/0247
                                            429/457
7,588,851 B2 *  9/2009  Asai ..................... H01M 8/0213
                                            429/434
(Continued)

FOREIGN PATENT DOCUMENTS

JP    2001-236975 A    8/2001
JP    2007-048484 A    2/2007
(Continued)

OTHER PUBLICATIONS

G.T. Suljak, Dummy Cell Would Improve Performance of Fuel-Cell Stack, NASA Tech Brief, Jan. 1993, p. 42. (Year: 1993).*
(Continued)

*Primary Examiner* — Milton I Cano
*Assistant Examiner* — Christian Roldan
(74) *Attorney, Agent, or Firm* — Finnegan, Henderson, Farabow, Garrett & Dunner, LLP

(57) ABSTRACT

A fuel cell stack includes multiple power generating units and a dummy unit, and respectively providing openings providing reactant-gas supply manifolds. Each power generating unit includes one or more first supply passages extending from the opening to a central region thereof. The dummy unit includes one or more second supply passages extending from the opening to a central region thereof, and a second supply passage port at the highest position in the vertical direction among the second supply passage ports where the second supply passages are connected to the opening is located at a lower position in the vertical direction
(Continued)

than a first supply passage port at the highest position in the vertical direction among the first supply passage ports where the first supply passages are connected to the opening.

7 Claims, 10 Drawing Sheets

(51) Int. Cl.
    *H01M 8/1018*     (2016.01)
    *H01M 4/86*     (2006.01)
    *H01M 8/2483*     (2016.01)
    *H01M 8/1004*     (2016.01)
    *H01M 8/0202*     (2016.01)
    *H01M 8/0258*     (2016.01)
    *H01M 8/241*     (2016.01)

(52) U.S. Cl.
    CPC ..... *H01M 8/0258* (2013.01); *H01M 8/04156* (2013.01); *H01M 8/1004* (2013.01); *H01M 8/241* (2013.01); *H01M 2004/8684* (2013.01); *H01M 2004/8689* (2013.01); *H01M 2008/1095* (2013.01); *Y02P 70/56* (2015.11)

(58) Field of Classification Search
    CPC ............. H01M 4/9041; H01M 8/1004; H01M 2008/1095; H01M 2004/8689; H01M 2004/8684; H01M 8/2465; Y02P 70/56
    USPC .......................................................... 429/452
    See application file for complete search history.

(56) References Cited

U.S. PATENT DOCUMENTS

| | | | |
|---|---|---|---|
| 7,767,355 B2* | 8/2010 | Kato | ................ H01M 8/04029 |
| | | | 429/456 |
| 2004/0038112 A1* | 2/2004 | Mohri | ................ H01M 4/8605 |
| | | | 429/458 |
| 2004/0202911 A1 | 10/2004 | Komura et al. | |
| 2004/0265667 A1 | 12/2004 | Kato et al. | |
| 2006/0216572 A1* | 9/2006 | Yoshida | .............. H01M 8/0258 |
| | | | 429/480 |
| 2016/0211543 A1 | 7/2016 | Okabe et al. | |

FOREIGN PATENT DOCUMENTS

| | | |
|---|---|---|
| JP | 2008-130350 | 6/2008 |
| JP | 2010-282866 | 12/2010 |
| JP | 2015-69737 | 4/2015 |
| KR | 100700073 B1 | 3/2007 |

OTHER PUBLICATIONS

U.S. Appl. No. 15/832,991, filed Dec. 6, 2017.
U.S. Appl. No. 15/845,149, filed Dec. 18, 2017.

* cited by examiner

FUEL CELL STACK

INCORPORATION BY REFERENCE

The disclosure of Japanese Patent Application No. 2017-058313 filed on Mar. 24, 2017 including the specification, drawings and abstract is incorporated herein by reference in its entirety.

BACKGROUND

1. Technical Field

The present disclosure relates to a fuel cell stack.

2. Description of Related Art

In a fuel cell stack, multiple power generating cells (referred to as "power generating units" in the present specification) are stacked while dummy cells (referred to as "dummy units" in the present specification) that generate no electric power are set on both sides in the stacking direction thereof (for example, Japanese Patent Application Publication No. 2015-69737 (JP 2015-69737 A)).

SUMMARY

When liquid water flows into supply manifolds of a reactant gas for a fuel cell, the liquid water flows along bottom surfaces (lower side in the gravity direction) of the supply manifolds. It is required for the dummy units to quickly take the liquid water into the dummy units and discharge the liquid water therefrom so that the liquid water does not flow into power generating units.

(1) An aspect of the present disclosure relates to a fuel cell stack. The fuel cell stack includes stacked multiple power generating units each of which has first central region where a reactant gas flows, the first central region being a region for generating electric power; and a dummy unit having a second central region where the reactant gas flows, the second central region being a region that is not for generating electric power, the dummy unit being provided to at least one stacking end of the stacked multiple power generating units. Each of the multiple power generating units includes: a first opening at a position outward of the first central region of the power generating unit, the position being higher in a vertical direction than a center of the first central region, the first opening providing a reactant-gas supply manifold in a state in which the multiple power generating units and the dummy unit are stacked; and one or more first supply passages extending from the first opening to the first central region. The dummy unit includes: a second opening located at a position outward of the second central region of the dummy unit, the position being higher in the vertical direction than a center of the second central region, the second opening providing the reactant-gas supply manifold in a state in which the multiple power generating units and the dummy unit are stacked; and one or more second supply passages extending from the second opening to the second central region A second supply passage port located at a highest position in the vertical direction among second supply passage ports where the second supply passages are connected to the second opening in the dummy unit is disposed at a lower position in the vertical direction than a first supply passage port located at a highest position in the vertical direction among first supply passage ports where the first supply passages are connected to the first opening in the power generating unit. When liquid water flows into the reactant-gas supply manifolds, the liquid water flows along bottom surfaces on the lower side in the gravity direction of the reactant-gas supply manifolds. According to this aspect, in the dummy unit, the second supply passage port located at the highest position in the vertical direction among the second supply passage ports where the second supply passages are connected to the second opening is disposed at a lower position in the vertical direction than the first supply passage port located at the highest position in the vertical direction among the first supply passages where the first supply passages are connected to the first opening in each power generating unit; therefore, the liquid water more easily flows to the second supply passages than to the first supply passages. Accordingly, the liquid water easily moves to the second central region of the dummy unit than to the first central regions of the power generating units, and thus amount of the liquid water moving beyond the dummy unit into the first central regions of the power generating units adjacent to the dummy unit is reduced, to thereby suppress the liquid water from entering into a particular power generating unit.

(2) All the second supply passage ports may be connected to the second opening at positions lower than a predetermined height in the vertical direction of the second opening from a bottom surface on the lower side in the vertical direction of the second opening, and at least one of the first supply passage ports may be connected to the first opening at a higher position than the predetermined height. With the configuration, all the second supply passage ports are located at lower positions than at least one of the first supply passage ports; therefore, the liquid water can securely move to the second central region of the dummy unit, to thereby suppress the liquid water from entering the first central regions of the power generating units.

(3) A sum of passage sectional areas of the one or more second supply passages may be smaller than a sum of passage sectional areas of the one or more first supply passages. With the configuration, the sum of the passage sectional areas of the second supply passages is smaller than the sum of the passage sectional areas of the first supply passages; therefore, a pressure loss when the reactant gas flows to the dummy unit is greater than a pressure loss when the reactant gas flows to the power generating units, to thereby suppress the reactant gas from flowing to the dummy unit.

(4) The number of the second supply passages may be smaller than the number of the first supply passages. With the configuration, the number of the second supply passages is smaller than the number of the first supply passages; therefore, a pressure loss when the reactant gas flows to the dummy unit is greater than a pressure loss when the reactant gas flows to the power generating units, to thereby suppress the reactant gas from flowing to the dummy unit.

(5) Each of the multiple power generating units may include more than one first supply passages, and the second supply passages may include a configuration corresponding to a shape when some of the first supply passages from a higher side in the vertical direction are removed from the first supply passages in the power generating unit. With the configuration, the second supply passages of the dummy unit include the configuration corresponding to the shape when some of the first supply passages from a higher side in the vertical direction are removed from the first supply passages in the power generating unit, to thereby easily realize the second supply passages having the configurations (1) to (4) and effects thereof.

The present disclosure can be embodied in various manners, and for example, the present disclosure can also be embodied in various manners such as a fuel cell system, a dummy unit, etc., other than the fuel cell stack.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
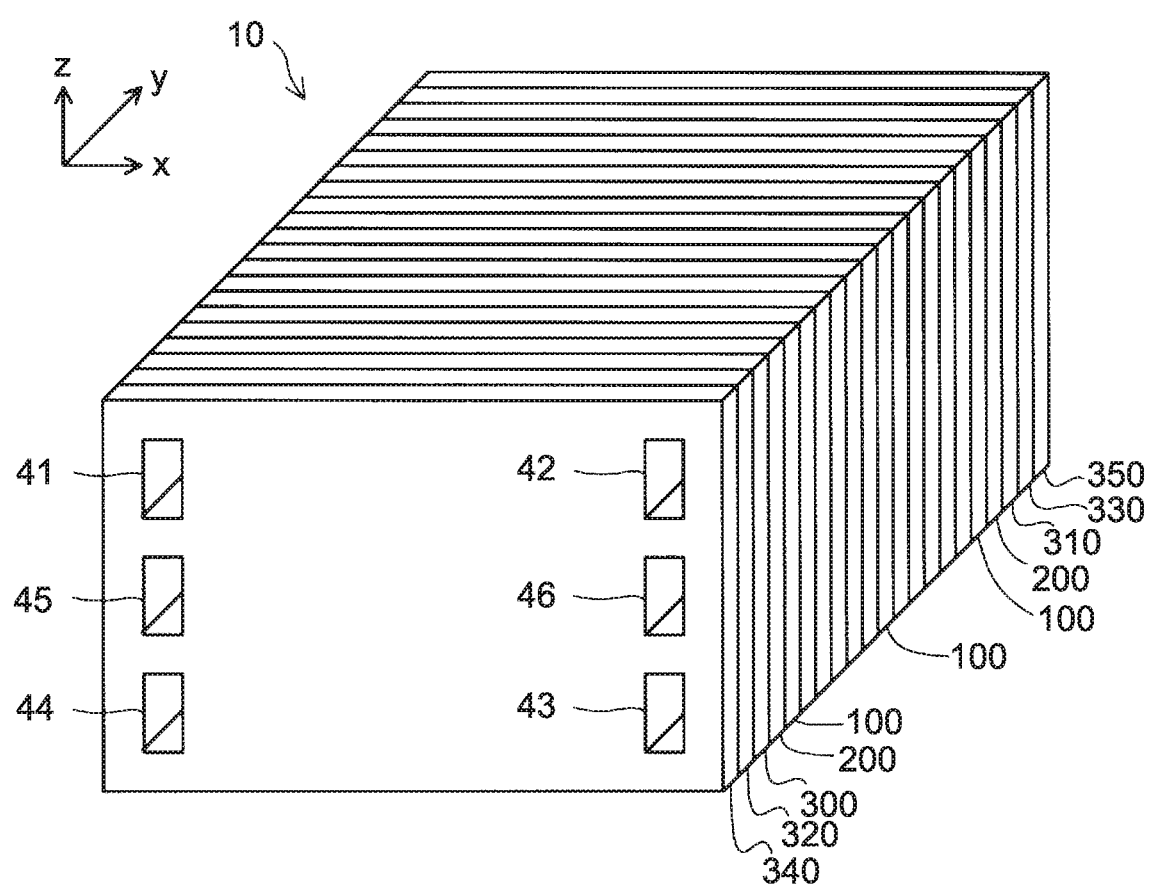
FIG. 1 is a perspective view of a fuel cell stack.

FIG. 1 is a perspective view of a fuel cell stack 10. The fuel cell stack 10 includes multiple power generating units 100, dummy units 200, current collecting plates 300, 310, electric-insulating plates 320, 330, and end plates 340, 350. The multiple power generating units 100 are stacked in the y direction (a horizontal direction) into a stacked body. Here, in the first embodiment, the horizontal direction is defined as the x direction and the y direction, and the vertical direction is defined as the z direction. The downward direction of the vertical direction is the gravity direction. The dummy units 200 are units having no function to generate electric power, and are disposed to stacking ends on the both sides in the y direction of the multiple stacked power generating units 100 with the multiple power generating units 100 held therebetween. The dummy unit 200 may be provided to at least either one stacking end of the both ends of the multiple power generating units 100. The dummy units 200 may be provided in the middle of the stacked power generating units 100. The current collecting plates 300, 310 are disposed outward in the y direction of the dummy units 200 so as to hold the multiple power generating units 100 and the dummy units 200 therebetween. The electric-insulating plates 320, 330 are disposed outward in the y direction of the current collecting plate 300 so as to hold the multiple power generating units 100, the dummy units 200, and the current collecting plates 300, 310 therebetween. The end plates 340, 350 are disposed outward in the y direction of the electric-insulating plates 320, 330 so as to hold the multiple power generating units 100, the dummy units 200, the current collecting plate 300, 310, and the electric-insulating plates 320, 330 therebetween.

The fuel cell stack 10 includes first to sixth manifolds 41 to 46. The manifolds 41 to 46 extend through the multiple power generating units 100, the dummy units 200, the current collecting plates 300, 310, the electric-insulating plates 320, 330, and the end plate 340, but do not extend through the end plate 350. The manifolds 41 to 46 may be configured not to extend through the current collecting plate 310 and the electric-insulating plate 330. Among the manifolds 41 to 46, the first manifold 41 and the second manifold 42 are manifolds for supplying the reactant gas, and are also referred to as "reactant-gas supply manifolds". The third manifold 43 and the fourth manifold 44 are manifolds for discharging the reactant gas, and are also referred to as "reactant-gas discharge manifolds". The reactant-gas supply manifolds are formed at higher positions in the vertical direction than the reactant-gas discharge manifolds. The fifth manifold 45 is a coolant supply manifold, and the sixth manifold 46 is a coolant discharge manifold.

Figure 2:
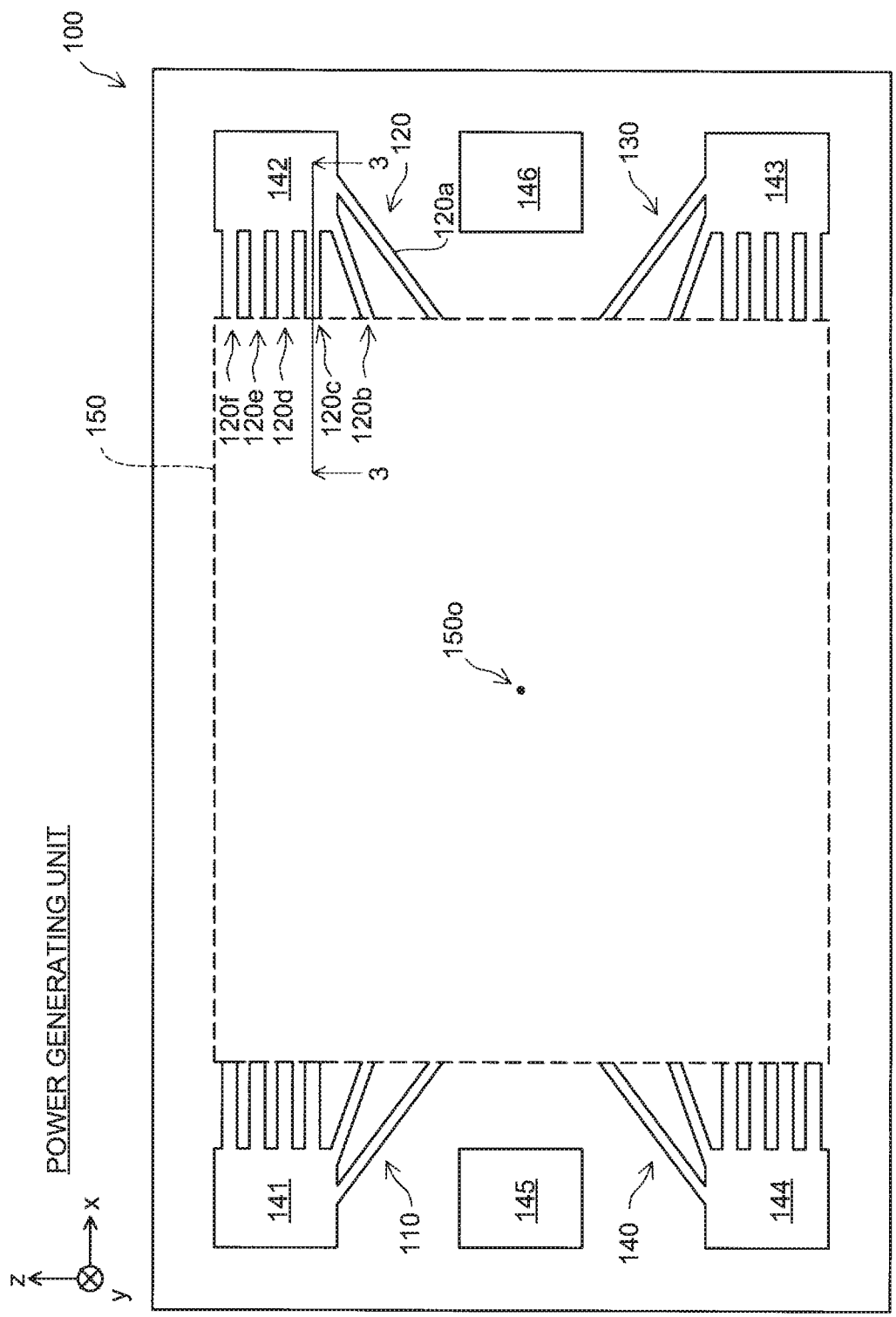
FIG. 2 is a plan view schematically showing a power generating unit.
Figure 3:
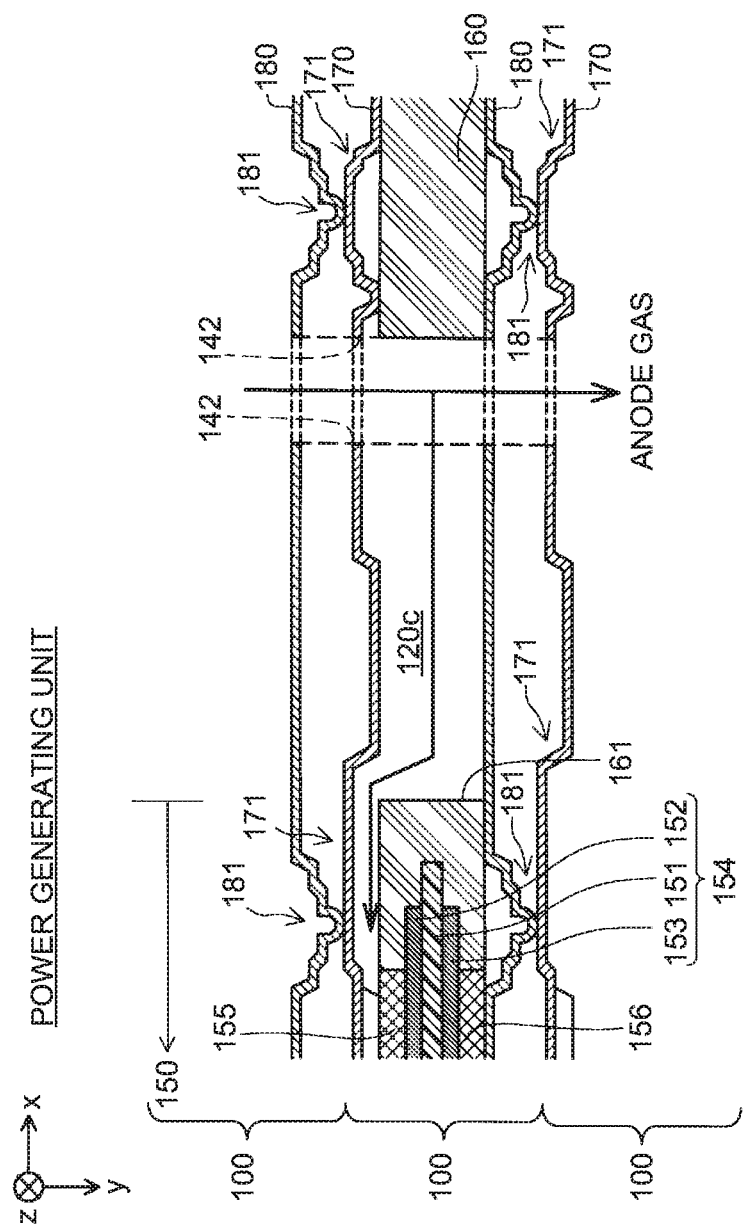
FIG. 3 is an explanatory view showing a section along a second flow passage of the power generating unit.

FIG. 2 is a plan view schematically showing each power generating unit 100. As shown in FIG. 3 described later, each actual power generating unit 100 has a structure that holds a resin frame 160 supporting a membrane electrode assemble 154 between two separator plates 170, 180. FIG. 2 schematically shows respective components for the purpose of explaining flows of a cathode gas and an anode gas. Although specific illustrations are omitted, a central region 150 of each power generating unit 100 is a power generation region, and is provided with the membrane electrode assemble 154 in a state of being supported by the resin frame 160. In the central region 150, a cathode-gas flow passage through which the cathode gas flows is provided on the back side in the y direction (the depth side in the drawing), and an anode-gas flow passage through which the anode gas flows is provided on the front side in the y direction (the front side in the drawing) with the membrane electrode assemble 154 interposed therebetween. It may be configured that the respective regions where the reactant gases flow are exchanged with each other so that the cathode-gas flow passage where the cathode gas flows is provided on the front side in the y direction, and the anode-gas flow passage where the anode gas flows is provided on the back side in the y direction, respectively. First to fourth openings 141 to 144, which respectively form the first to the fourth manifolds 41 to 44 in FIG. 1 when the power generating units 100 are stacked, are formed at four corners of the power generating units 100 surrounding the central regions 150. Here, each first opening 141 and each second opening 142 are formed at higher positions in the vertical direction than a center 150o of each central region 150. Here, the "higher position" in the vertical direction than the center 150o of the central region 150 does not mean a position immediately above the center 150o, but means a position above a horizontal line passing through the center 150o. Each fifth opening 145 forming the fifth manifold 45 is formed between each first opening 141 and each fourth opening 144, and each sixth opening 146 forming the sixth manifold 46 is formed between each second opening 142 and each third opening 143.

Respective vicinities of the first opening 141 and the third opening 143 are provided with first flow passages 110 and third flow passages 130 that respectively connect the first opening 141 and the third opening 143 to the cathode-gas flow passage of the central region 150. Respective vicinities of the second opening 142 and the fourth opening 144 are respectively provided with second flow passages 120 and fourth flow passages 140 that respectively connect the second opening 142 and the fourth opening 144 to the anode-gas flow passage of the central region 150. The first to the fourth flow passages 110, 120, 130, 140 are embodied by grooves formed in the resin frame 160 and grooves (recessed portions) formed in a surface of each separator plate 170 or 180 that composes each power generating unit 100. Hence, normally, boundary lines are present at boundaries between the respective openings 141 to 144 and the respective flow passages 110, 120, 130, 140, but illustrations of the boundary lines are omitted in FIG. 2 for convenience of understanding.

The second flow passages 120 are composed by multiple second flow passages 120a to 120f that are arranged along the gravity direction. The first flow passages 110 have the same configuration. The third flow passages 130 and the fourth flow passages 140 have almost the same configurations.

FIG. 3 is an explanatory drawing showing a section (a section 3-3 in FIG. 2) along the second flow passage 120c of the power generating unit 100. FIG. 3 shows the section along the second flow passage 120c, and the other second flow passages 120a, 120b, 120d to 120f have almost the same configurations. Each power generating unit 100 includes the resin frame 160, two separator plates 170, and the separator plate 180. The resin frame 160 is formed by resin, and holds the membrane electrode assemble 154 in such a manner as to surround the membrane electrode assemble 154. The membrane electrode assemble 154 includes an electrolyte film 151, an anode catalytic layer 152, and a cathode catalytic layer 153. The electrolyte film 151 is composed by an ion exchange resin film exhibiting a preferable proton conductivity in a wet condition. More specifically, the electrolyte film 151 is composed by a fluorine resin-based ion exchange resin film containing a sulfonate group as an ion-exchange group, such as Nafion (registered trademark). Each of the anode catalytic layer 152 and the cathode catalytic layer 153 contains a carbon supporting catalyst (e.g., platinum), and ionomer containing a sulfonate group ($-SO_3H$), for example. On the anode catalytic layer 152 and the cathode catalytic layer 153, an anode-gas diffusion layer 155 and a cathode-gas diffusion layer 156 are disposed, respectively. The anode-gas diffusion layer 155 and the cathode-gas diffusion layer 156 are formed by carbon paper or carbon non-woven fabric. In addition, the anode-gas diffusion layer 155 and the cathode-gas diffusion layer 156 may be formed by expand metal or a metallic porous material other than carbon paper and carbon non-woven fabric.

The separator plate 180 includes projections 181 projecting toward a separator plate 170 of another adjacent power generating unit 100. The separator plate 170 includes receiving portions 171 at positions opposing the projections 181. The projections 181 are pushed against the receiving portions 171 so as to form a seal between the power generating unit 100 and another adjacent power generating unit 100 to each other. Note that an adhesive agent or a seal material (not illustrated) is disposed between the projections 181 and the receiving portions 171. The seal is also formed in the same configuration even if the adjacent unit is the dummy unit 200. It may be configured that each separator plate 170 is provided with the projecting portions and each separator plate 180 is provided with the receiving portions. In the present embodiment, there is employed the configuration to form the seal between the projections 181 and the receiving portions 171 with an adhesive agent or a seal material disposed therebetween, but the seal may be formed by using a gasket.

Each resin frame 160 includes a groove 161. One end of the groove 161 is connected to the second opening 142. The other end of the groove 161 passes between the receiving portion 171 that is a groove provided in a surface of the separator plate 170 and the resin frame 160 and is connected to the anode-gas diffusion layer 155 on the anode side of the membrane electrode assemble 154 of the central region 150. The second flow passage 120c is formed by the groove 161 and the groove (recessed portion) provided in the surface of the separator plate 170. The other second flow passages 120a, 120b, 120d to 120f, the first flow passages 110, the third flow passages 130, and the fourth flow passages 140 are formed by the grooves 161 formed in the resin frame 160 and grooves (recessed portions) provided in the surface of the separator plate 170 or the separator plate 180 that composes each power generating unit 100.

Figure 4:
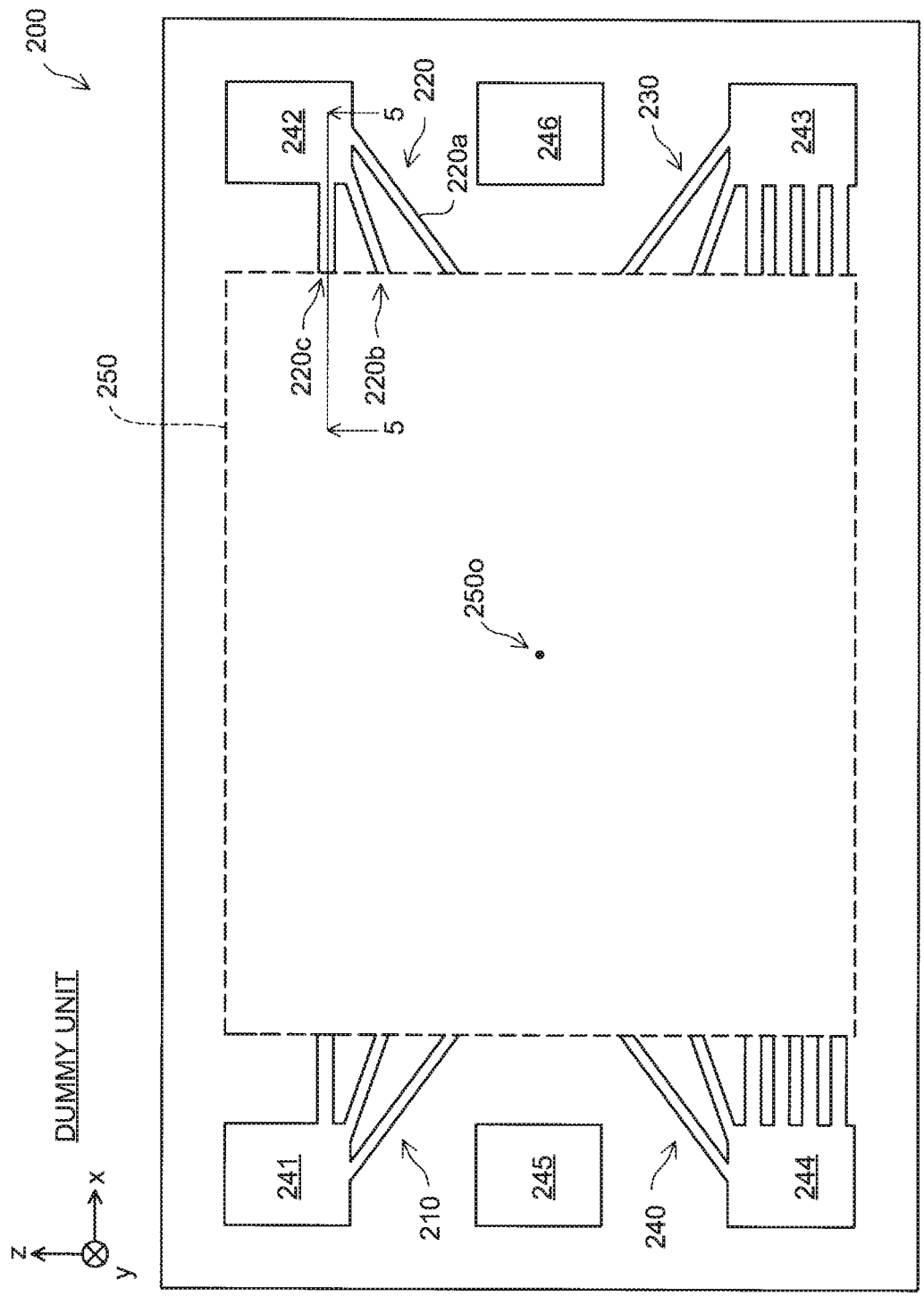
FIG. 4 is a plan view schematically showing a dummy unit.
Figure 5:
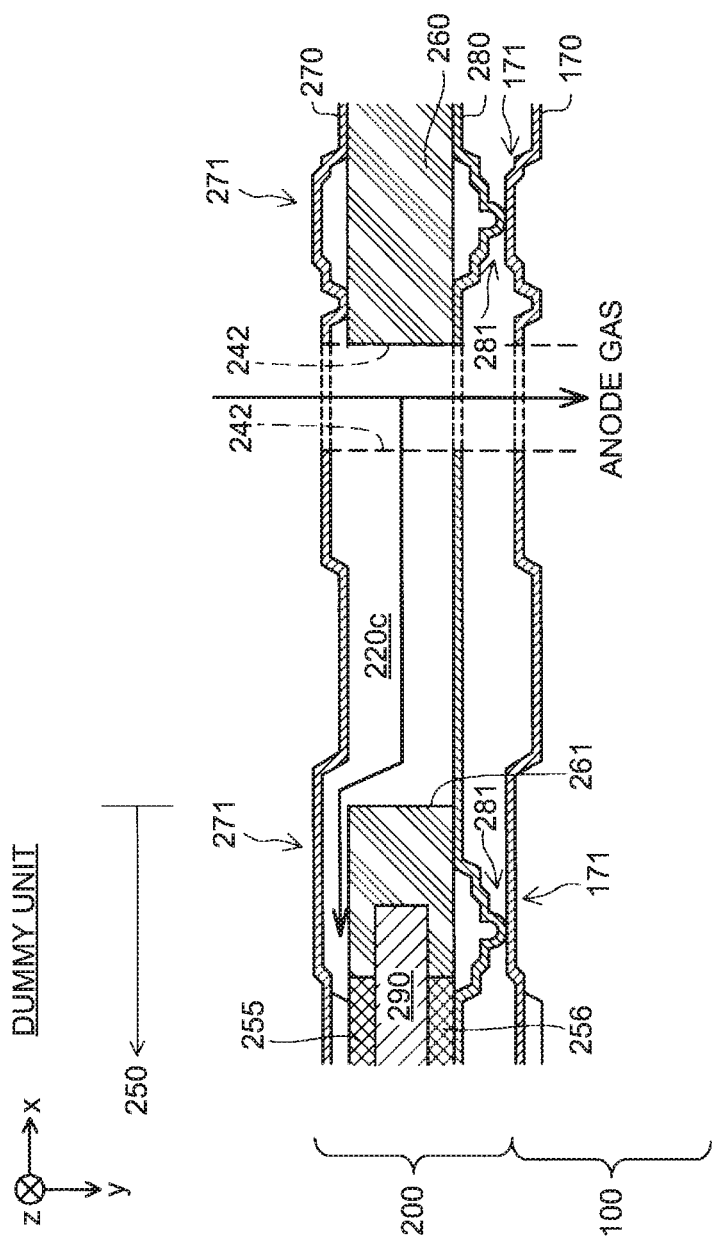
FIG. 5 is an explanatory view showing a section along a second flow passage of the dummy unit.

FIG. 4 is a plan view schematically showing the dummy unit 200. FIG. 5 is an explanatory view showing a section (a section 5-5 in FIG. 4) along the second flow passage of the dummy unit. Here, respective components and the like of the dummy unit 200 shown in FIG. 4 and FIG. 5 are represented by reference numerals obtained by adding 100 to reference numerals for the respective components and the like of the power generating unit 100 shown in FIG. 2 and FIG. 3. The members having reference numerals obtained by adding 100 to the reference numerals of the respective members and the like of the power generating unit 100 have the same configurations as those of the respective members of the power generating unit 100, and thus description thereof will be omitted. The power generating unit 100 and the dummy unit 200 are different from each other in the following respects.

Each power generating unit 100 includes the membrane electrode assemble 154 in the central region 150 thereof; and each dummy unit 200 includes no membrane electrode assemble, but includes a metallic plate 290 in a central region 250 thereof, instead. The metallic plate 290 has a function to prevent the anode gas and the cathode gas from being mixed together in the central region 250 of the dummy unit 200. By using the metallic plate 290, it is possible to electrically conduct an anode-gas diffusion layer 255 and a cathode-gas diffusion layer 256 of the dummy unit 200 to each other. Instead of using the metallic plate 290, a material having gas permeability and electric conductivity, such as carbon, may be used. In the present embodiment, there is employed a configuration that allows the anode gas and the cathode gas to flow in a single dummy cell. Instead of this, there may be employed such a configuration that disposes two dummy cells: one is a dummy cell for the anode gas including first flow passages 210 and third flow passages 230 but including no second flow passages 220 and no fourth flow passages 240, and the other is a dummy cell for the cathode gas including the second flow passages 220 and the fourth flow passages 240 but including no first flow passages 210 and no third flow passages 230. In this case, no cathode gas flows through the central region of the dummy cell for the anode gas, and no anode gas flows through the central region of the dummy cell for the cathode gas; therefore, it is unnecessary for the two dummy cells to include the metallic plates 290. In this case, the dummy cell for the anode gas and the dummy cells for the cathode gas may be adjacently arranged to each other.

The power generating unit 100 includes multiple second flow passages 120a to 120f arranged along the gravity direction as the second flow passages 120. In the meantime, the dummy unit 200 includes multiple second flow passages 220a to 220c arranged along the gravity direction as the second flow passages 220, but includes no second flow passages corresponding to the second flow passages 120d to 120f. This is the same in the first flow passages 210. In the present embodiment, the second flow passages 120a to 120f of the power generating unit 100 may be deemed as the first supply passages of the present disclosure, and the second flow passages 220a to 220c of the dummy unit 200 of the present disclosure may be deemed as the second supply passages.

Figure 6:
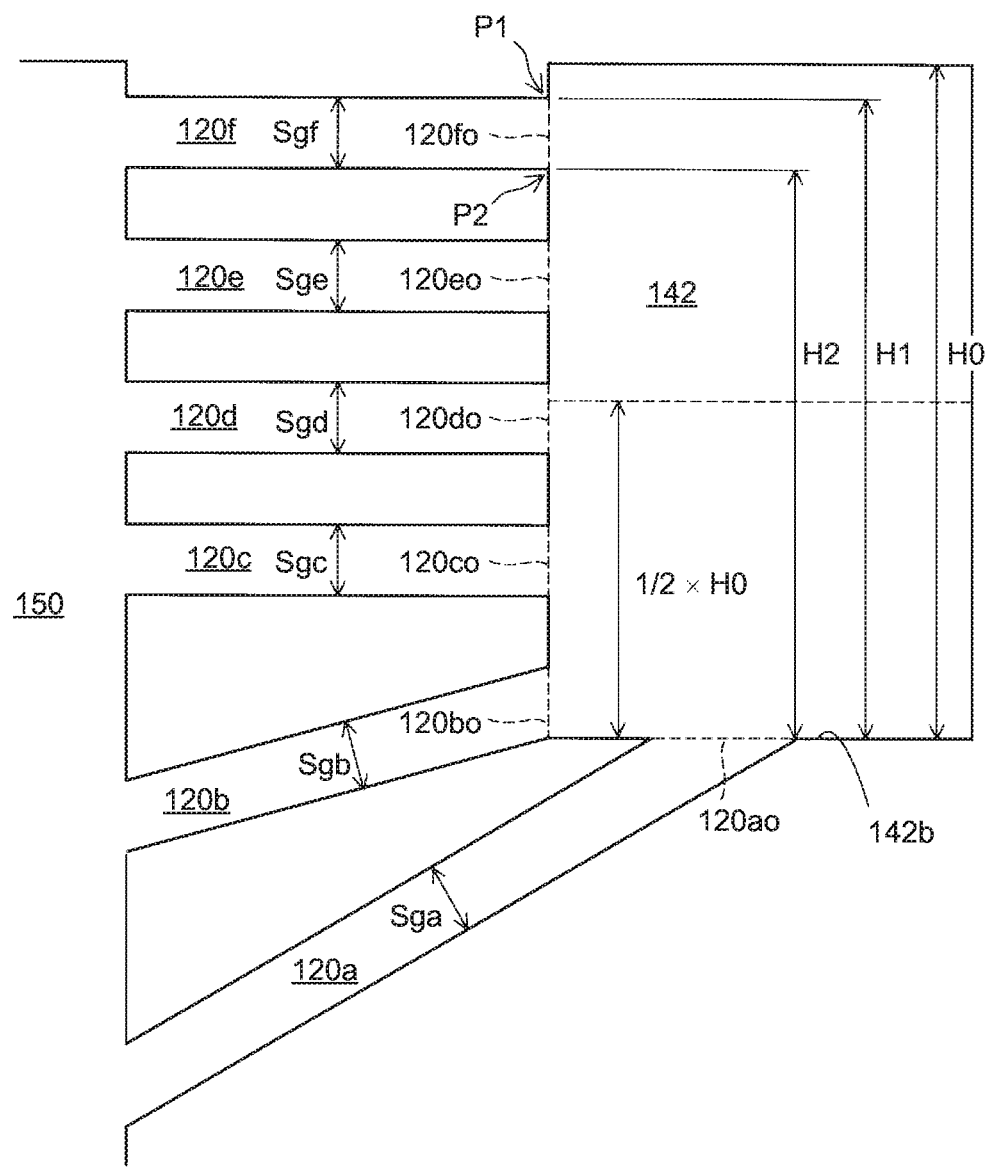
FIG. 6 is an enlarged explanatory view showing a vicinity of a second opening of the power generating unit.
Figure 7:
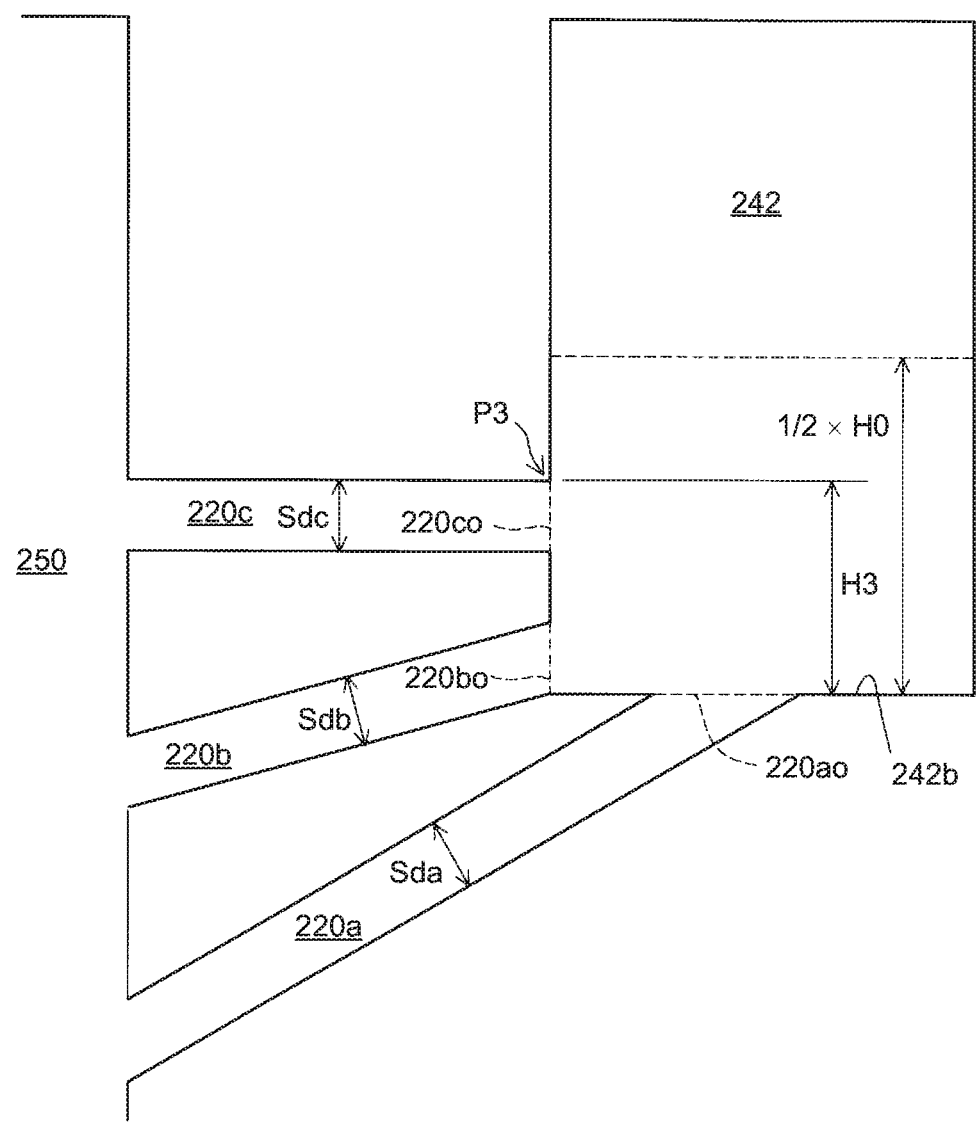
FIG. 7 is an enlarged explanatory view showing a vicinity of a second opening of the dummy unit.

FIG. 6 is an enlarged explanatory view showing the vicinity of the second opening 142 of the power generating unit 100. FIG. 7 is an enlarged explanatory view showing the vicinity of a second opening 242 of the dummy unit 200. Hereinafter, differences between the second flow passages 120 of the power generating unit 100 and the second flow passages 220 of the dummy unit 200 will be described.

(i) A second flow-passage port 220co, which is located at the highest position among second flow-passage ports 220ao to 220co where the respective second flow passages 220a to 220c are connected to the second opening 242 in the dummy unit 200, is disposed at a lower position in the vertical direction than a second flow-passage port 120fo located at the highest position among the second flow-passage ports 120ao to 120fo where the second flow passages 120a to 120f are connected to the second opening 142 in the power generating unit 100. Note that first supply passage ports of the present disclosure may be deemed as the second flow-passage ports 120ao to 120fo of each power generating unit 100, and second supply passage ports of the present disclosure may be deemed as the second flow-passage ports 220ao to 220co of the dummy unit 200.

(ii) All the second flow-passage ports 220ao to 220co of the dummy unit 200 are connected to the second opening 242 at positions less than ½ of a height H0 in the vertical direction of the second opening 242 from a bottom surface 242b on the lower side in the vertical direction of the second opening 242. At least one of the second flow-passage ports 120ao to 120fo of the power generating unit 100, for example, the second flow-passage port 120eo is connected to the second opening 142 at a position more than ½ of the height H0 in the vertical direction of the second opening 142 from a bottom surface 142b on the lower side in the vertical direction of the second opening 142.

(iii) In the present embodiment, the second flow passages 220a to 220c of the dummy unit 200 has a configuration corresponding to a shape when the second flow passages 120d to 120f that are three upper flow passages in the vertical direction are removed from the second flow passages 120a to 120f of the power generating unit 100.

(iv) A sum (Sda+Sdb+Sdc) of passage sectional areas of the second flow passages 220a to 220c of the dummy unit 200 is smaller than a sum (Sga+Sgb+Sgc+Sgd+Sge+Sgf) of passage sectional areas of the second flow passages 120a to 120f of the power generating unit 100. Here, a passage sectional area of a flow passage is a smallest sectional area of a flow passage of interest when the flow passage is cut at a cross section across the flow passage. In other words, the passage sectional area is the smallest sectional area of each flow passage.

(v) The number (i.e., 3) of the second flow passages 220a to 220c of the dummy unit 200 is smaller than the number (i.e., 6) of the second flow passages 120a to 120f of the power generating unit 100.

Due to the differences in (i) to (v), in the power generating unit 100 and the dummy unit 200, the following differences are caused in flows of the liquid water and the reactant gas.

When the liquid water enters the second manifold 42 shown in FIG. 1, the liquid water flows along the bottom surface (the bottom surface 142b in FIG. 6 or the bottom surface 242b in FIG. 7) on the lower side in the gravity direction of the second manifold 42. As shown in (i), if the second flow-passage port 220co at the highest position among the second flow-passage ports 220ao to 220co is located at a lower position in the vertical direction than the second flow-passage port 120fo at the highest position among the second flow-passage port 120ao to 120fo, the liquid water is more likely to flow to the second flow passages 220a to 220c of the dummy unit 200 than to the second flow passages 120a to 120f of the power generating unit 100. As a result, the liquid water more easily moves to the central region 250 of the dummy unit 200 than to the central region 150 of the power generating unit 100, so that amount of the liquid water moving beyond the dummy unit 200 to the central region 150 of the power generating unit 100 adjacent to the dummy unit 200 becomes smaller, to thereby suppress the liquid water from entering a particular power generating unit.

According to the configuration in (i), when the liquid water enters the second manifold 42, the second flow-passage ports 220ao to 220co of the dummy unit 200 is closed earlier than the second flow-passage ports 120do to 120fo of the power generating unit 100 because the second flow-passage ports 220ao to 220co of the dummy unit 200 are located at lower positions in the vertical direction than the second flow-passage ports 120do to 120fo of the power generating unit 100. As a result, due to a difference in pressure between the second manifold 42 and the central region 250, the liquid water more easily moves through the second flow passages 220a to 220c to the central region 250 of the dummy unit 200.

Note that, in order to satisfy (i), any one of the following conditions may be satisfied. (a) A height H3 from the bottom surface 242b of the second opening 242 of the dummy unit 200 to a highest position P3 in the vertical direction of the second flow-passage port 220co is lower than a height H1 from the bottom surface 142b of the second opening 142 of the power generating unit 100 to a highest position P1 in the vertical direction of the second flow-passage port 120fo. (b) The height H3 from the bottom surface 242b of the second opening 242 of the dummy unit 200 to the highest position P3 in the vertical direction of the second flow-passage port 220co is lower than a height H2 from the bottom surface 142b of the second opening 142 of the power generating unit 100 to a lowest position P2 in the vertical direction of the second flow-passage port 120fo. Note that if (b) is satisfied, (a) is necessarily satisfied.

As shown in (ii), all the second flow-passage ports 220ao to 220co of the dummy unit 200 are connected to the second opening 242 at positions less than ½ of the height H0 in the vertical direction of the second opening 242; and if at least one of the second flow-passage ports 120ao to 120fo of the power generating unit 100 is connected to the second opening 142 at a position more than ½ of the height H0 in the vertical direction of the second opening 142, as with (i), due to the difference in pressure between the second manifold 42 and the central region 250, the liquid water more easily flows to the second flow passages 220a to 220c of the dummy unit 200 than to the second flow passages 120a to 120f of the power generating unit 100. As a result, the liquid water more easily moves to the central region 250 of the dummy unit 200 than to the central region 150 of the power generating unit 100, so that the amount of the liquid water moving beyond the dummy unit 200 to the central region 150 of the power generating unit 100 adjacent to the dummy unit 200 becomes smaller, to thus suppress the liquid water from entering a particular power generating unit.

Further, if (ii) is satisfied, there is no flow passage extending from a position more than ½ of the height H0 in the vertical direction of the second opening 242 to the central region 250 of the dummy unit 200; thus, it is difficult for the reactant gas to flow toward the central region 250 of the dummy unit 200, to thereby suppress the reactant gas from being wastefully used.

Note that if (ii) is satisfied, (i) is necessarily satisfied, and further, the reactant gas is suppressed from being wastefully used, which is preferable. However, taking the movement of the liquid water into account, it is sufficient to satisfy only (i), and it is preferable but not essential to satisfy (ii). In (ii), ½ of the height H0 in the vertical direction of the second opening 242 is merely an example, and this may be ⅓, ⅔, or ¼ of the height H0. Any height not less than 0 may be set as the reference. That is, it is only required that all the second supply passage ports 220ao to 220co of the dummy unit 200 are connected to the second opening 242 at positions lower than a predetermined height from the bottom surface on the lower side in the vertical direction of the second opening 242, and at least one of the second flow-passage ports (the first supply passage ports) 120ao to 120fo of the power generating unit 100 is connected to the second opening 142 at a position higher than the predetermined height. For example, the predetermined height may be set to be the height H3 at the highest position P3 of the second supply passage ports 220ao to 220co of the dummy unit 200. It is preferable to set the height H3 to be as small as possible. As the height H3 is smaller, the second flow passages 220 of the dummy unit 200 are closed earlier than the second flow passages 120 of the power generating unit 100 are. As a result, due to the difference in pressure between the second manifold 42 and the central region 250, the liquid water more easily moves through the second flow passages 220a to 220c to the central region 250 of the dummy unit 200.

As shown in (iii), if the second flow passages 220a to 220c of the dummy unit 200 have the configuration corresponding to the shape when the second flow passages 120d to 120f of the power generating unit 100 that are three upper flow passages in the vertical direction are removed from the second flow passages 120a to 120f of the power generating unit 100, the requirement (i) is necessarily satisfied. Accordingly, as with (i), the liquid water more easily flows to the second flow passages 220a to 220c of the dummy unit 200 than to the second flow passages 120a to 120f of the power generating unit 100. As a result, the liquid water more easily moves to the central region 250 of the dummy unit 200 than to the central region 150 of the power generating unit 100, so that the amount of the liquid water moving to the central region 150 of the power generating unit 100 adjacent to the dummy unit 200 becomes smaller, to thus suppress the liquid water from entering a particular power generating unit. In the present embodiment, the number of the second flow passages of the power generating unit 100 is six, and the number of the second flow passages 220 of the dummy unit 200 is three; but if the number of the second flow passages of the power generating unit 100 is two or more, it is possible to satisfy (iii). After the power generating unit 100 is designed, it is possible to design the dummy unit 200 simply by removing the configuration corresponding to the second flow passages 120d to 120f, and thus the design cost can be reduced.

If (iii) is satisfied, the dummy unit 200 has no flow passage reaching to the central region 250 of the dummy unit 200 at a higher position in the vertical direction of the second opening 242, compared with the power generating unit 100; therefore, it is more difficult for the reactant gas to flow to the central region 250 of the dummy unit 200, and thus it is possible to suppress the reactant gas from being wastefully used. In addition, as aforementioned, if (iii) is satisfied, (i) is necessarily satisfied, which is preferable in light of suppression of the wasteful use of the reactant gas, but if the movement of the liquid water is considered, it is sufficient to satisfy only (i), and it is not essential to satisfy (iii).

As shown in (iv), if the sum (Sda+Sdb+Sdc) of the passage sectional areas of the second flow passages 220a to 220c of the dummy unit 200 is set to be smaller than the sum (Sga+Sgb+Sgc+Sgd+Sge+Sgf) of the passage sectional areas of the second flow passages 120a to 120f of the power generating unit 100, it is possible to set a pressure loss when the reactant gas flows to the central region 250 of the dummy unit 200 to be greater than a pressure loss when the reactant gas flows to the central region 150 of the power generating unit 100. As a result, it is possible to suppress the reactant gas from flowing to the dummy unit. It is sufficient that the sum of the passage sectional areas of the second flow passages 220a to 220c is smaller than the sum of the passage sectional areas of the second flow passages 120a to 120f, and it is unnecessary to equalize respective passage sectional areas of the corresponding flow passages, such as Sda and Sga, Sdb and Sgb, and Sdc and Sgc. Note that if (i) is satisfied, (iv) may not be satisfied.

If the respective passage sectional areas of the second flow passages 220a to 220c of the dummy unit 200, and the respective passage sectional areas of the second flow passages 120a to 120f of the power generating unit 100 are substantially equal to each other, the sum of the passage sectional areas is proportional to the number of the second flow passages. As shown in (v), if the number (three) of the second flow passages 220a to 220c of the dummy unit 200 is set to be smaller than the number (six) of the second flow passages 120a to 120f of the power generating unit 100, the sum of the passage sectional areas in the number of the second flow passages 220a to 220c of the dummy unit 200 is smaller than the sum of the passage sectional areas of the second flow passages 120a to 120f of the power generating unit 100. As a result, as with (iv), the pressure loss when the reactant gas flows to the central region 250 of the dummy unit 200 is greater than the pressure loss when the reactant gas flows to the central region 150 of the power generating unit 100, to thereby suppress the reactant gas from flowing to the dummy unit. If (i) is satisfied, (v) may not be satisfied.

Second Embodiment

Figure 8:
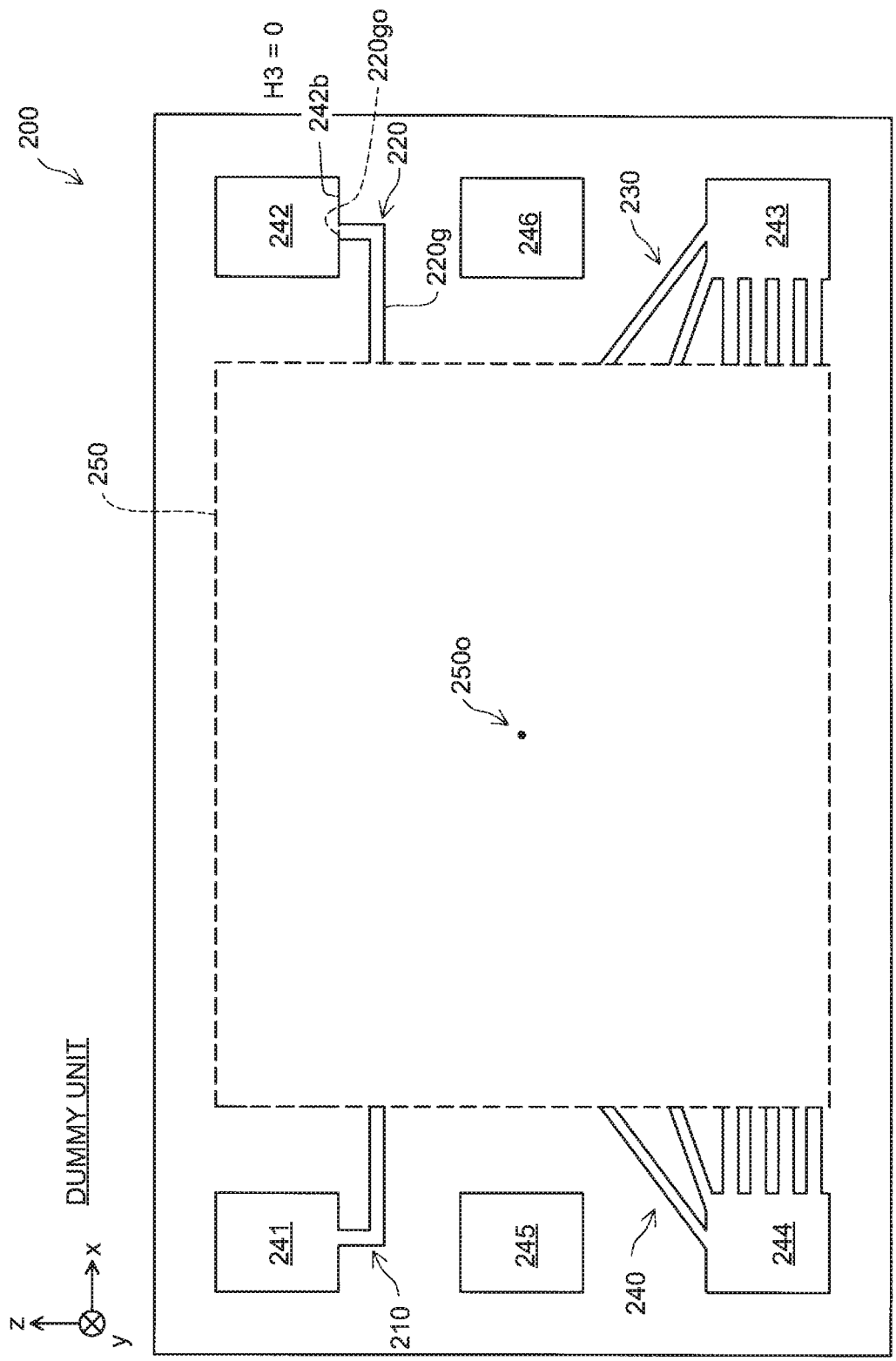
FIG. 8 is a plan view schematically showing a dummy unit of a second embodiment.

FIG. 8 is a plan view schematically showing the dummy unit 200 of the second embodiment. Different from the first embodiment, in the second embodiment, as the second flow passages 220 of the dummy unit 200, a single second flow passage 220g is connected to the bottom surface 242b located at a lower position in the gravity direction of the second opening 242. In the example shown in FIG. 8, the second flow passage 220g is in a bent shape, but may be in a straight shape like the second flow passage 220a as shown in FIG. 4 of the first embodiment. In this case, the dummy unit 200 has such a configuration that the second flow passages 120*b* to 120*f* excluding the second flow passage 120*a* are removed from the power generating unit 100.

In the second embodiment, the second flow-passage port 220*go* of the second flow passage 220*g* is located at the same height as that of the bottom surface 242*b* of the second opening 242, and thus H3=0 is satisfied. Hence, (i) described in the first embodiment is satisfied. Accordingly, also in the second embodiment, as with the first embodiment, it becomes easier to move the liquid water to the central region 250 of the dummy unit 200, to thus suppress the water from entering the central region 150 of the power generating unit 100. Further, the second flow-passage port 220*go* of the only one second flow passage 220*g* is closed. As a result, due to the pressure difference between the second manifold 42 and the central region 250, the liquid water easily moves through the second flow passage 220*g* to the central region 250 of the dummy unit 200. Accordingly, the liquid water more easily moves to the central region 250 of the dummy unit 200 compared with the first embodiment. As a result, the amount of the liquid water moving to the central region 150 of the power generating unit 100 adjacent to the dummy unit 200 becomes further smaller, to thereby suppress the liquid water from entering a particular power generating unit 100.

The only one second flow passage 220*g* is connected to the bottom surface 242*b*, there is no route where the reactant gas flows to the dummy unit 200, and the sum of the passage sectional areas in the second flow passages 220 is further smaller, and thus it becomes difficult for the reactant gas to enter the central region 250 of the dummy unit 200, to thereby further avoid the waste of the reactant gas.

In the first and the second embodiments, the description has been provided by exemplifying the second flow passages 120, 220 that supply the anode gas, but the same configuration may be employed in the first flow passages 110, 210 that supply the cathode gas. In this case, the first flow passages 110 of the power generating unit 100 can be deemed as the first supply passages of the present disclosure, and the first flow passages 210 of the dummy unit 200 can be deemed as the second supply passages.

Figure 9:
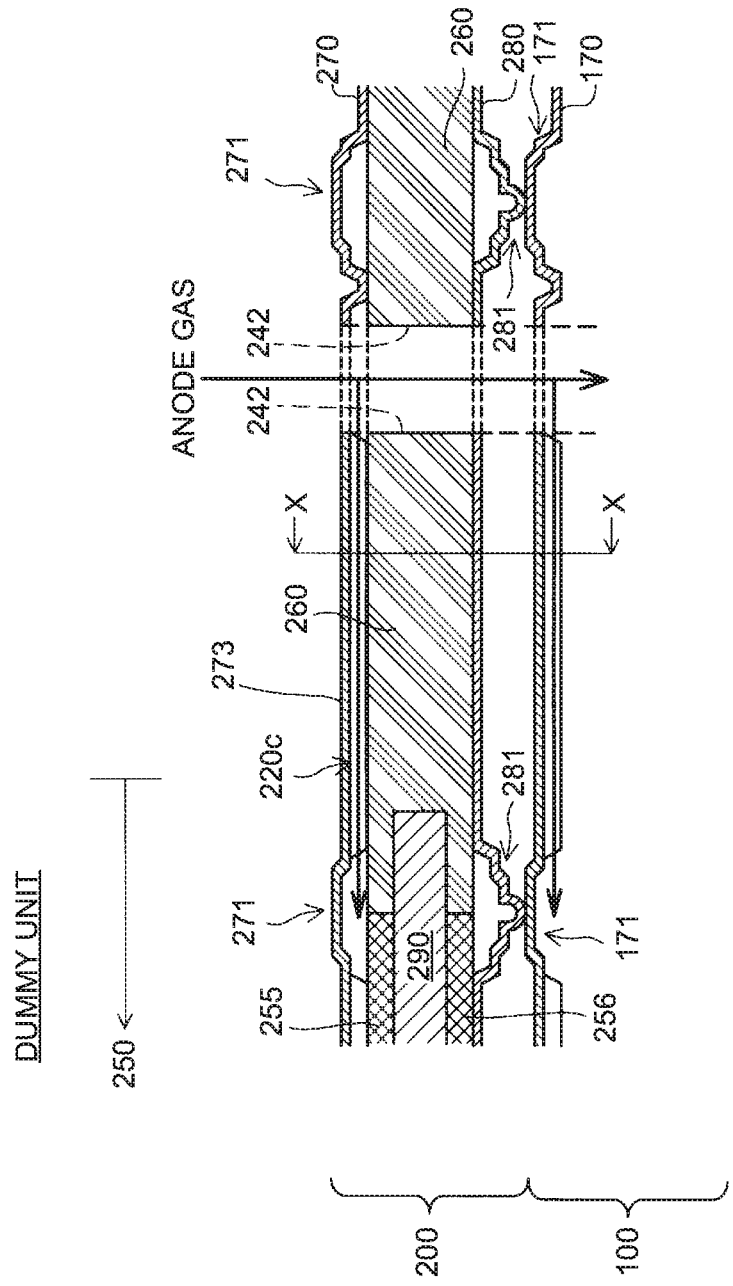
FIG. 9 is a sectional view showing a section along a second flow passage of a dummy unit of another embodiment.
Figure 10:
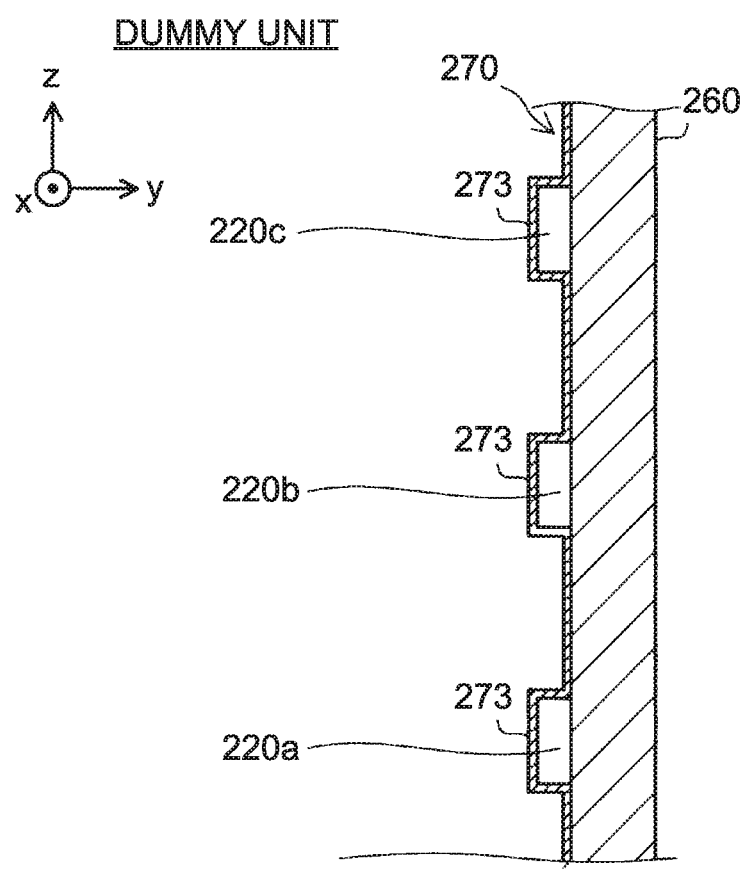
FIG. 10 is an explanatory view showing a section X-X in FIG. 9.

First Variation:

FIG. 9 is a sectional view along the second flow passage 220*c* of the dummy unit 200 of the first variation. FIG. 10 is an explanatory view showing an X-X section in FIG. 9. The first variation is different from the first embodiment and the second embodiment in that the second flow passages 220 are formed by grooves 261 formed in a resin frame 260 in the first embodiment and the second embodiment, but in the first variation, the second flow passages 220 are formed by flow-passage forming portions 273 formed in a separator plate 270. Although not illustrated in the drawing, the first flow passages 210 of the dummy unit 200 are formed by flow-passage forming portions formed in a separator plate 280. This is the same in the third flow passage 230 and the fourth flow passage 240 of the dummy unit 200. This is also the same in the power generating unit 100. In this manner, the first to the fourth flow passages may be formed not by using the grooves 261, 161 of the resin frames 260, 160, but by using the separator plates. However, as with the first and the second embodiments, if the first to the fourth flow passages are formed by using the grooves 261, 161 of the resin frames 260, 160, the separator plates 170, 180 of the power generating unit 100 and the separator plates 270, 280 of the dummy unit 200 can commonly be used, so that necessity of preparing them separately is eliminated. As a result, dies of the separator plates 170, 270 can commonly be used, and dies of the separator plates 180 and 280 can commonly be used, thus providing such a merit that the manufacturing cost can be reduced.

Second Variation:

In the aforementioned first and second embodiments, the introduction flow passages and the discharge flow passages of the reactant gas are formed by forming the grooves 261 in the resin frame 260. The resin frame may be formed by injection molding, and may be formed by using a base material and an adhesive sheet applied to both surfaces of the base material.

Third Variation:

In the aforementioned respective embodiments and variations, the positions of the second flow-passage ports 120*fo*, 220*co* located at the uppermost positions in the vertical direction have been described, but no particular description has been provided on the positions of the second flow-passage ports 120*ao*, 220*ao* located at the lowermost positions in the vertical direction; however, the second flow-passage port 220*ao* of the dummy unit 200 may be provided at a lower position in the vertical direction than the second flow-passage port 120*ao* of the power generating unit 100. Here, providing the second flow-passage port 220*ao* of the dummy unit 200 at a lower position in the vertical direction than the second flow-passage port 120*ao* of the power generating unit 100 means that the lowest position of the second flow-passage port 220*ao* of the dummy unit 200 may be located more downward in the vertical direction than the lowest position of the second flow-passage port 120*ao* of the power generating unit 100. It is more preferable that the lowest position of the second flow-passage port 220*ao* of the dummy unit 200 is located at a lower position in the vertical direction than the highest position of the second flow-passage port 120*ao* of the power generating unit 100. In the third variation, the liquid water is likely to flow from the second flow-passage port 220*ao* of the dummy unit 200 located at a lower position to the central region 250 thereof by the gravity, and thus the amount of the liquid water moving to the central region 150 of the power generating unit 100 adjacent to the dummy unit 200 becomes further smaller, to thereby suppress the liquid water from entering a particular power generating unit 100. It is more preferable that the second flow-passage port located at the uppermost position in the vertical direction of the dummy unit 200 is located at a lower position in the vertical direction than the second flow-passage port 120*ao* at the lowermost position in the vertical direction of the power generating unit 100. When the liquid water reaches the second flow-passage port 120*ao* located at the lowermost position in the vertical direction of the power generating unit 100, the second flow-passage port of the dummy unit 200 is securely closed by the liquid water; therefore, it becomes easier to move the liquid water to the central region 250 of the dummy unit 200. As a result, the amount of the liquid water moving to the central region 150 of the power generating unit 100 adjacent to the dummy unit 200 can be further reduced, to thereby suppress the liquid water from entering a particular power generating unit 100.

The present disclosure is not limited to the above-mentioned embodiments and variations, and can be embodied in various forms without departing from the scope of the present disclosure. For example, it is feasible to appropriately replace or combine any of the technical features of the aspects of the present disclosure described in Summary of the Disclosure and the technical features of the above-mentioned embodiments and variations of the present disclosure in order to solve part or all of the above-mentioned problems or achieve part or all of the above-mentioned effects. Any of the technical features, if not explained as essential in the present specification, may be deleted as appropriate.

What is claimed is:

1. A fuel cell stack comprising:

stacked multiple power generating units, each of which has a first central region where a reactant gas flows, the first central region being a region configured for generating electric power; and a dummy unit having a second central region where the reactant gas flows, the second central region being a region that is not configured for generating electric power, the dummy unit being provided to at least one stacking end of the stacked multiple power generating units, wherein at least one of the power generating units includes:

a first opening located at a position outward from the first central region of the power generating unit, the position of the first opening being higher in a vertical direction than a center of the first central region, the first opening configured to provide a reactant-gas supply manifold in a state in which the multiple power generating units and the dummy unit are stacked;

one or more first supply passages extending from the first opening to the first central region; and one or more first supply passage ports where the first supply passages are connected to the first opening, the first supply passage ports including an upper first supply passage port that is located at a highest position in the vertical direction among the first supply passage ports, the dummy unit includes:

a second opening located at a position outward from the second central region of the dummy unit, the position of the second opening being higher in the vertical direction than a center of the second central region, the second opening configured to provide the reactant-gas supply manifold in the state in which the multiple power generating units and the dummy unit are stacked;

one or more second supply passages extending from the second opening to the second central region; and one or more second supply passage ports where the second supply passages are connected to the second opening, the second supply passage ports including an upper second supply passage port that is located at a highest position in the vertical direction among the second supply passage ports, and the upper second supply passage port of the dummy unit is disposed at a lower position in the vertical direction than the upper first supply passage port of the at least one power generating unit.

2. The fuel cell stack according to claim 1, wherein all of the second supply passage ports of the dummy unit are connected to the second opening of the dummy unit at positions lower than a predetermined height in the vertical direction of the second opening from a bottom surface on a lower side in the vertical direction of the second opening, and at least one of the first supply passage ports of the at least one power generating unit is connected to the first opening of the at least one power generating unit at a higher position than the predetermined height.

3. The fuel cell stack according to claim 2, wherein the predetermined height is half of a height in the vertical direction of the second opening of the dummy unit from the bottom surface on the lower side in the vertical direction of the second opening.

4. The fuel cell stack according to claim 1, wherein a sum of passage sectional areas of the one or more second supply passages of the dummy unit is smaller than a sum of passage sectional areas of the one or more first supply passages of the at least one power generating unit.

5. The fuel cell stack according to claim 1, wherein the number of the second supply passages of the dummy unit is smaller than the number of the first supply passages of the at least one power generating unit.

6. The fuel cell stack according to claim 1, wherein each of the multiple power generating units includes more than one first supply passage, and the second supply passages of the dummy unit have a configuration corresponding to a shape of a subset of the first supply passages of the at least one power generating unit, the subset excluding the upper first supply passage of the at least one power generating unit.

7. The fuel cell stack according to claim 6, wherein the second supply passages of the dummy unit have the same shape as the shape of the subset of the first supply passages of the at least one power generating unit.

* * * * *